L. A. INGERSOLL.
FOOD CHOPPER.
APPLICATION FILED MAR. 6, 1913.

1,097,325.

Patented May 19, 1914.
3 SHEETS—SHEET 2.

Witnesses:
J. E. Bookstaver
M. E. Kinney

Inventor:
Luther A. Ingersoll,
By
Luther L. Mack
Attorney.

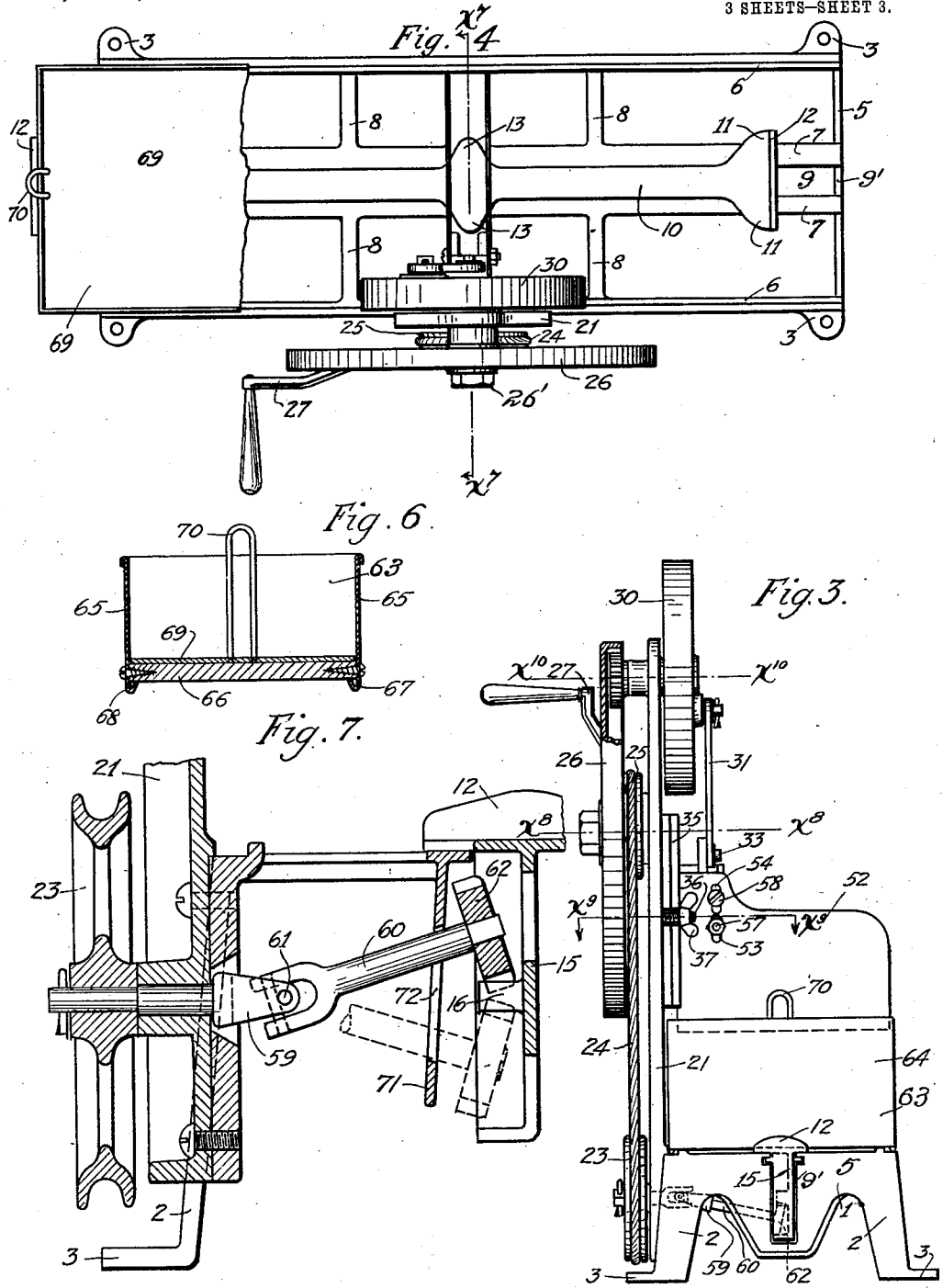

UNITED STATES PATENT OFFICE.

LUTHER A. INGERSOLL, OF SANTA MONICA, CALIFORNIA.

FOOD-CHOPPER.

1,097,325.  Specification of Letters Patent.  Patented May 19, 1914.

Application filed March 6, 1913. Serial No. 753,462.

*To all whom it may concern:*

Be it known that I, LUTHER A. INGERSOLL, a citizen of the United States, residing at Santa Monica, in the county of Los Angeles and State of California, have invented a new and useful Food-Chopper, of which the following is a specification.

My invention relates to improvements in food choppers, and one of the objects of my invention is to provide a food chopper that may be operated rapidly by a comparatively slow hand movement.

Another object is to provide a chopper that is sanitary and easily cleaned.

Another object is to provide such a chopper that will reverse the action forward and backward automatically.

Other objects may appear as described.

I attain these objects by means of the mechanism illustrated in the accompanying drawings, in which—

Figure 1:
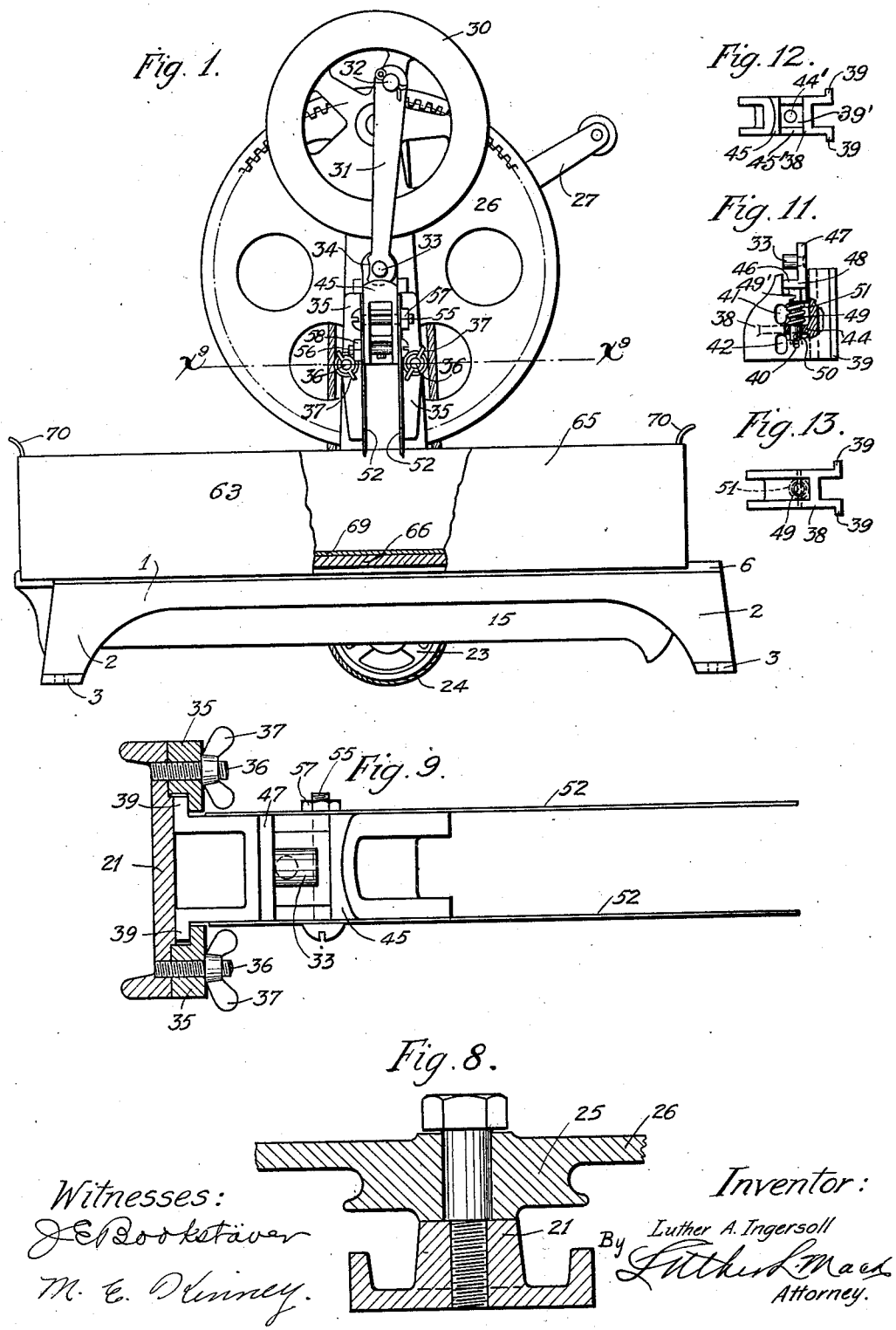
Figure 2:
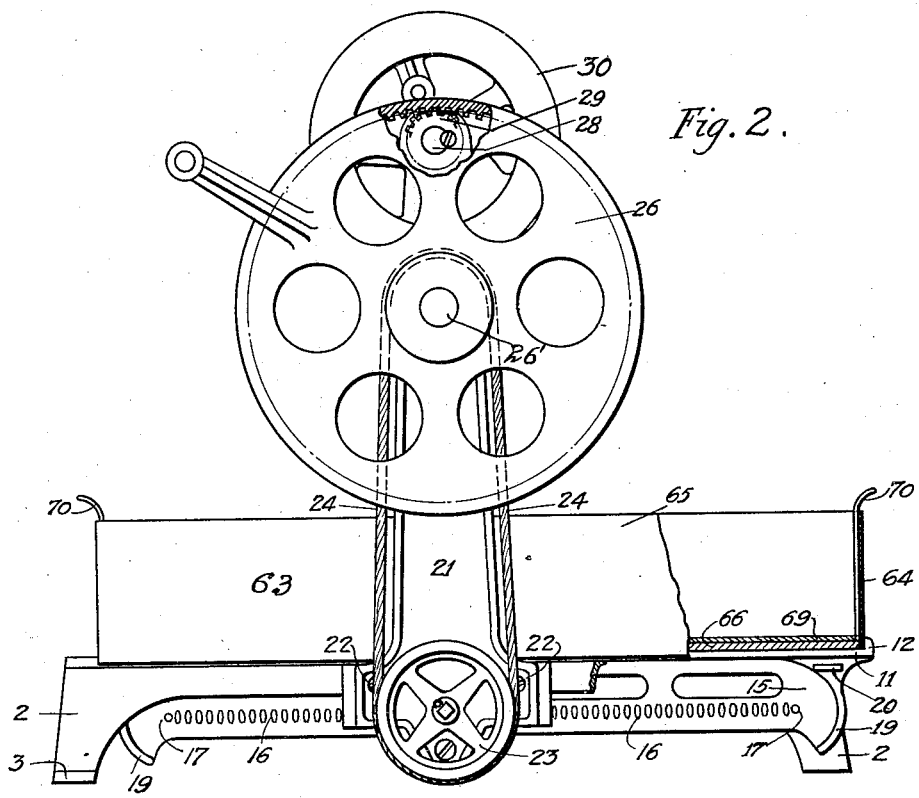
Figure 5:
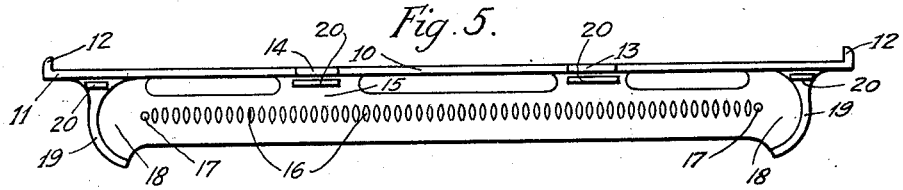
Figure 10:
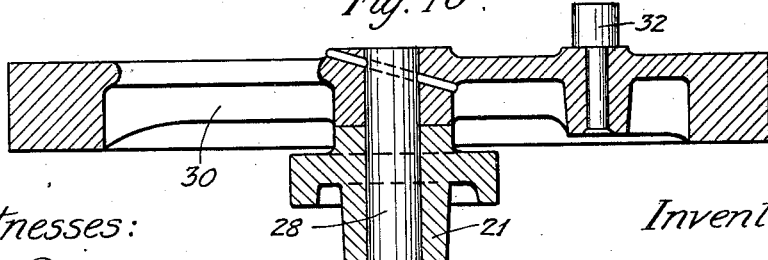

Figure 1 is a front elevation of my chopper with a portion of the pan broken away. Fig. 2 is a rear elevation with a portion of the web of the internal gear, and a portion of the pan cut away. Fig. 3 is an end elevation. Fig. 4 is a plan view showing the pan partly broken away. Fig. 5 is a side elevation of the carrier. Fig. 6 is a sectional vertical elevation of the pan. Fig. 7 is a sectional view of the universal joint and the rack and pinion, on the line $X^7$—$X^7$, Fig. 4. Fig. 8 is a cross section on the line $X^8$—$X^8$ Fig. 3. Fig. 9 is a cross section on the line $X^9$—$X^9$ Fig. 1, and Fig. 3, through the crosshead guideway screws with the crosshead in lowered position. Fig. 10 is a cross section on the line $X^{10}$—$X^{10}$ Fig. 3. Fig. 11 is a side elevation of the cross head. Fig. 12 is a top view of the same. Fig. 13 is a bottom view of the same.

The same reference characters indicate the same parts in the different figures.

The base 1 is cast of metal, and is provided with the legs 2 and the feet 3. This base may be secured to a suitable support by means of screws through the feet 3. The top of the base is in the form of an open frame with the flanged tracks 6 in the outer edge and the smooth tracks 7 running lengthwise through the center, leaving the open space 9 between the latter. The lateral stays 8 hold the tracks rigid. In the center of the ends 5 is cut the deep groove 9′ registering with the space 9. Slidably positioned in the space 9 is the carrier 10 having formed on its topmost edge the lateral lugs 13 and 14 adapted to slide on the tracks 7. The ends of this carrier have similar lugs 11 and the extreme ends are upturned to form the vertical lugs 12. From the top of the carrier 10 depends the vertical flange 15, on one side of which is formed the rack 16 composed of separate vertical oblong teeth, at the extreme ends of which are the separate cylindrical teeth 17. The two ends of the flange 15 are semi-circular in shape having the right-angled semi-circular guide lips 19 formed thereon, their concave side being inward. At each end, and therebetween, are formed the pins 20 adapted to run under the tracks 7.

On the outside of one side of the base 1 is secured the standard 21 by the screws 22. On the outside of this standard the large internal gear 26 provided with the crank 27 and the grooved pulley 25, is revolubly mounted on the stud 26′. The shaft 28 is journaled in the upper end of the standard 21 and has secured to its outer end the pinion 29, adapted to mesh with the gear 26 and upon the other end is mounted the flywheel 30.

Below the large gear 26 is revolubly mounted on the shaft 59, the pulley 23 upon which is the belt 24 which also passes around the pulley 25 on the gear 26. The shaft 59 has a bearing in the standard 21 and extends through it, the other end being connected by a universal joint 61 with the shaft 60 on the end of which is secured the pinion 62 which is adapted to mesh with the rack 16 on the carrier flange 15.

On the flywheel 30 is journaled the upper end of the connecting rod 31. Below this flywheel the adjustable crosshead guides 35 are secured to the standard 21 by the screws 36 and the wing nuts 37 and slidably positioned between these guides is the crosshead 38. This crosshead has formed thereon the sides 38, the transverse portion 44 which is provided with the perforation 44′, the vertical lip 45, the guides 39, and the seat 45′ having the rectangular perforation 39′. In the sides 38 of the crosshead are the two vertical slots 41 and 42 and the smaller slot 40. The spring plunger 46 has the vertical lip 47 on the face of which is the pin 33.

It has also the lateral shoulders 48 adapted to limit the downward stroke of the plunger by contact with the sides of the seat 45' when the plunger is inserted therein. The stem 49 has the rectangular portion 49' at the top adapted to slide in the opening 39' and the rounded portion at the bottom adapted to pass freely through the perforation 44' and has the lateral pins 50 near its lower end adapted to engage and work freely vertically in the slots 40 below the partition 44 thus limiting its movement. The spring 51 on the stem 49 is compressible between the top 49' of the plunger and the partition 44 and thus makes the plunger slightly resilient.

The lower end of the connecting rod 31 has the concave depression 34 on one side of it and it is journaled on the pin 33 so adapted that when in assembling, by holding it in a horizontal position the concave depression 34 will pass over the lip 45. It is then turned up and the upper end placed on the pin 32 on the flywheel 30. The knives 52 have the slots 53 and 54 cut in them and they are secured to each side of the seat 38 by means of the bolts 55 and 56 and the nuts 57 and 58, the slots 53 and 54 being the same size and shape as the slots 41 and 42, permit an adjustment of the knives.

The pan 63 is composed of a wooden bottom 66 with the metal ends 64 secured to it in a suitable manner and the sides 65 secured in the same manner, their ends being soldered to the ends 64 and their bottoms being bent inward to form the flanges 67 and 68. A removable wooden bottom 69 with handles 70 is provided to set in the pan 63 as a sanitary means of ready cleaning. This pan is set upon the carrier 10, the lugs 12 serving to hold it in place and the flanges 67 and 68 riding inside the flange track 6. On the base underneath, the carrier is a pendent lug 71 having a vertical slot 72 through which the shaft 60 passes.

In operation, vegetables or meat or other food-stuffs are placed in the pan; and the crank 27 being turned, the knives 52 are forced up and down rapidly in the pan. At the same time the pinion 62 drives the carrier along in one direction carrying the pan with it. When the carrier end reaches the pinion 62 the pinion drops over the end of the rack 16 and guided by the convex lip 19 drops down, and is held in mesh with the under part of the rack by the lower wall of the slot 72 and thus reverses the carrier and carries it back in the opposite direction. When it reaches that limit it is again reversed by the pinion 62 being guided around to the top of the rack 16. In this manner by a simple turning of the crank 27 the pan is carried back and forth and the chopping knives are made to cut the contents of the pan. Should the knives strike any resisting substance like a bone or a hard root, the spring plunger gives and thus prevents a breaking of the knives.

Having described my invention fully, what I claim as my invention is,—

1. In a food chopper, the combination of a base having a longitudinal raised guideway on each side of the center of the top longitudinal and lateral ribs on the top and an opening between the longitudinal ribs and in the center of the top, a carrier having a vertical central rib in said opening adapted to slide on said guideways and lateral outwardly projecting lugs adapted to slide on the top of said base, and upwardly projecting lugs at each end, a food pan removably seated on said carrier between said end lugs, and means to slide said carrier in alternate directions on said guide ways from one end thereof to the other.

2. In a food chopper comprising a base and a food containing receptacle; a chopping mechanism having a crosshead with outwardly projecting flanges adapted to engage suitable guideways on the frame of the machine, a plunger having a vertical lug at the top adapted to be connected with a connecting rod operable by the driving mechanism of the machine slidably seated in said crosshead having a shoulder in the center and a stem at the bottom provided with a spring adapted to press upwardly against said shoulder, means for limiting the stroke of the plunger, and a plurality of cutting knives secured to said crosshead, in combination, as described.

3. In a food chopper comprising a base, a food containing receptacle and a driving mechanism; a food chopping mechanism having a crosshead adapted to slide vertically on the frame of the machine, a plunger slidably seated in said crosshead having means at the top thereof for connection with said driving mechanism, a shoulder in the center, a stem on the lower end and a spring on the stem adapted to press upwardly against said shoulder, means for limiting the stroke of said plunger, and a plurality of cutting knives secured to said crosshead, in combination, as described.

4. In a food chopper comprising a base, a food containing receptacle and a driving mechanism; a chopping member consisting of a crosshead having outwardly projecting flanges on each side adapted to engage suitable guideways on the frame of the machine and to slide vertically thereon, side ribs extending outwardly and at right angles from said flanges, a transverse rib near the vertical center of and connecting said ribs, a perforation in said transverse rib adapted to receive the stem of a plunger, a plunger vertically slidable in said crosshead, having means at the top for connection with said driving mechanism, a shoulder in the center of said plunger, a stem on the lower end of said plunger seated in said perforation, a spring on said stem adapted to compress between said transverse rib and said shoulder for forcing the plunger upward and absorbing the shock of the plunger on the down stroke, a seat in the top of the crosshead to receive the plunger, cutting knives on the crosshead having vertically disposed slots therein, bolts through said crosshead and said slots, and nuts on the bolts for holding said knives rigidly against said crosshead and in removable relation thereto, in combination, as described.

LUTHER A. INGERSOLL.

Witnesses:
LUTHER L. MACK,
J. E. BOOKSTÄVE.